(12) United States Patent
Kemp, II et al.

(10) Patent No.: US 7,505,932 B2
(45) Date of Patent: *Mar. 17, 2009

(54) CLICK BASED TRADING WITH MARKET DEPTH DISPLAY

(75) Inventors: Gary Alan Kemp, II, Winnetka, IL (US); Jens-Uwe Schluetter, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 651 days.

This patent is subject to a terminal disclaimer.

(21) Appl. No.: 11/061,554

(22) Filed: Feb. 18, 2005

(65) Prior Publication Data

US 2005/0149429 A1 Jul. 7, 2005

Related U.S. Application Data

(63) Continuation of application No. 09/589,751, filed on Jun. 9, 2000, now Pat. No. 6,938,011.

(60) Provisional application No. 60/186,322, filed on Mar. 2, 2000.

(51) Int. Cl.
G06Q 40/00 (2006.01)

(52) U.S. Cl. .............................. 705/35; 705/36; 705/37

(58) Field of Classification Search ............. 705/34–37, 705/45
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 5,038,284 A | 8/1991 | Kramer | |
| 5,077,665 A | 12/1991 | Silverman et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,689,651 A | 11/1997 | Lozman | |
| 5,774,877 A | 6/1998 | Patterson, Jr. et al. | |
| 5,793,301 A | 8/1998 | Patterson, Jr. et al. | |

(Continued)

FOREIGN PATENT DOCUMENTS

WO   WO 95/26005   9/1995

(Continued)

OTHER PUBLICATIONS www.tradingtechnologies.com/products/xtrade_full.html and /ttnews.com.

(Continued)

*Primary Examiner*—Richard Weisberger
(74) *Attorney, Agent, or Firm*—McDonnell Boehnen Hulbert & Berghoff LLP (57) ABSTRACT

A method and system for reducing the time it takes for a trader to place a trade when electronically trading commodities on an exchange, thus increasing the likelihood that the trader will have orders filled at desirable prices and quantities. Click based trading, as described herein and specifically the "Click" and "Dime" methods of the present invention, enables a trader to execute single mouse click trades for large volumes of commodities at a price within a pre-specified range.

17 Claims, 8 Drawing Sheets

U.S. PATENT DOCUMENTS

| | | |
|---|---|---|
| 5,797,002 A | 8/1998 | Patterson, Jr. et al. |
| 5,845,266 A | 12/1998 | Lupien et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,963,923 A | 10/1999 | Garber |
| 6,012,046 A | 1/2000 | Lupien et al. |
| 6,014,643 A | 1/2000 | Minton |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,408,282 B1 | 6/2002 | Buist |
| 6,938,011 B1 | 8/2005 | Kemp et al. |
| 2002/0023038 A1 | 2/2002 | Fritsch et al. |
| 2002/0055899 A1 | 5/2002 | Williams |
| 2002/0138401 A1 | 9/2002 | Allen et al. |
| 2006/0195389 A1 | 8/2006 | Kemp et al. |

FOREIGN PATENT DOCUMENTS

| | | |
|---|---|---|
| WO | WO98/49639 | 11/1998 |
| WO | WO99/19821 | 4/1999 |
| WO | WO99/30259 | 6/1999 |
| WO | WO99/53424 | 10/1999 |
| WO | WO 00/52619 | 9/2000 |
| WO | WO 00/62187 | 10/2000 |
| WO | WO 00/65510 | 11/2000 |
| WO | WO 01/16830 | 3/2001 |
| WO | WO 01/22315 | 3/2001 |
| WO | WO 01/88808 | 11/2001 |

OTHER PUBLICATIONS

Kharouf, a trading room with a view, Futures 27, Nov.-Nov. 1998, 6 pages.

USPTO Presentation, NASDAQ, Nov. 8, 2001, enclosed pp. 1-13.

CLICK BASED TRADING WITH MARKET DEPTH DISPLAY

PRIORITY

The present application is a Continuing Application of U.S. Ser. No. 09/589,751, filed Jun. 9, 2000, which claims priority to U.S. Provisional Patent Application Ser. No. 60/186,322, entitled "Market Depth Display Click Based Trading and Mercury Display" filed Mar. 2, 2000, the contents of which are incorporated herein by reference.

FIELD OF INVENTION

The present invention is directed to the electronic trading of commodities. Specifically, the invention provides a trader with a versatile and efficient tool for executing trades. It facilitates the display of and the rapid placement of trade orders within the market trading depth of a commodity, where a commodity includes anything that can be traded with quantities and/or prices.

BACKGROUND OF THE INVENTION

At least 60 exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through three types of structures: high speed data lines, high speed communications servers and the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures and options exchanges have volatile products with prices that move rapidly. To profit in these markets, traders must be able to react quickly. A skilled trader with the quickest software, the fastest communications, and the most sophisticated analytics can significantly improve his own or his firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies and requires the same information to and from every trader. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of this information, the market will not accept the order. This input and output of information is the same for every trader.

With these variables being constant, a competitive speed advantage must come from other aspects of the trading cycle. When analyzing the time it takes to place a trade order for a given commodity, various steps contribute in different amounts to the total time required. Approximately 8% of the total time it takes to enter an order elapses between the moment the host generates the price for the commodity and the moment the client receives the price. The time it takes for the client application to display the price to the trader amounts to approximately 4%. The time it takes for a trade order to be transmitted to the host amounts to approximately 8%. The remainder of the total time it takes to place an order, approximately 80%, is attributable to the time required for the trader to read the prices displayed and to enter a trade order. The present invention provides a significant advantage during the slowest portion of the trading cycle—while the trader manually enters his order. Traders recognize that the value of time savings in this portion may amount to millions of dollars annually.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before he could enter the order, he may lose hundreds, thousands, even millions of dollars. The faster a trader can trade, the less likely it will be that he will miss his price and the more likely he will make money.

SUMMARY OF THE INVENTION

The inventors have developed the present invention which overcomes the drawbacks of the existing trading systems and dramatically reduces the time it takes for a trader to place a trade when electronically trading on an exchange. This, in turn, increases the likelihood that the trader will have orders filled at desirable prices and quantities.

Click based trading, as described herein and specifically the "Click" and "Dime" methods of the present invention, enables a trader to execute single mouse click trades for large volumes of commodities at a price within a pre-specified range.

Specifically, the present invention is directed to a method and system for placing a trade order for a commodity on an electronic exchange using a client system with a user input device and with preset parameters for trade orders. The invention includes displaying a market depth of the commodity through a dynamic display of prices and quantities of a plurality of bids and asks in the market for the commodity. The invention also includes initiating placement of a trade order of the commodity in response to a single action of the user input device with a pointer of the user input device positioned over an area in the dynamic display. The contents of the trade order are based in part upon the preset parameters and the position of the pointer at the time of the single action by the user.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

As described with reference to the accompanying figures, the present invention provides a method and system for display of a traded commodity's market depth and for facilitating rapid placement of trade orders within the market depth. A commodity's market depth is the current bid and ask prices and quantities in the market. The invention increases the likelihood that the trader will be able to execute orders at desirable prices and quantities.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, the specification refers to a single click of a mouse as a means for user input and interaction with the terminal display as an example of a single action of the user. While this describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, is considered a single action of the user for the purposes of the present invention.

Figure 1:
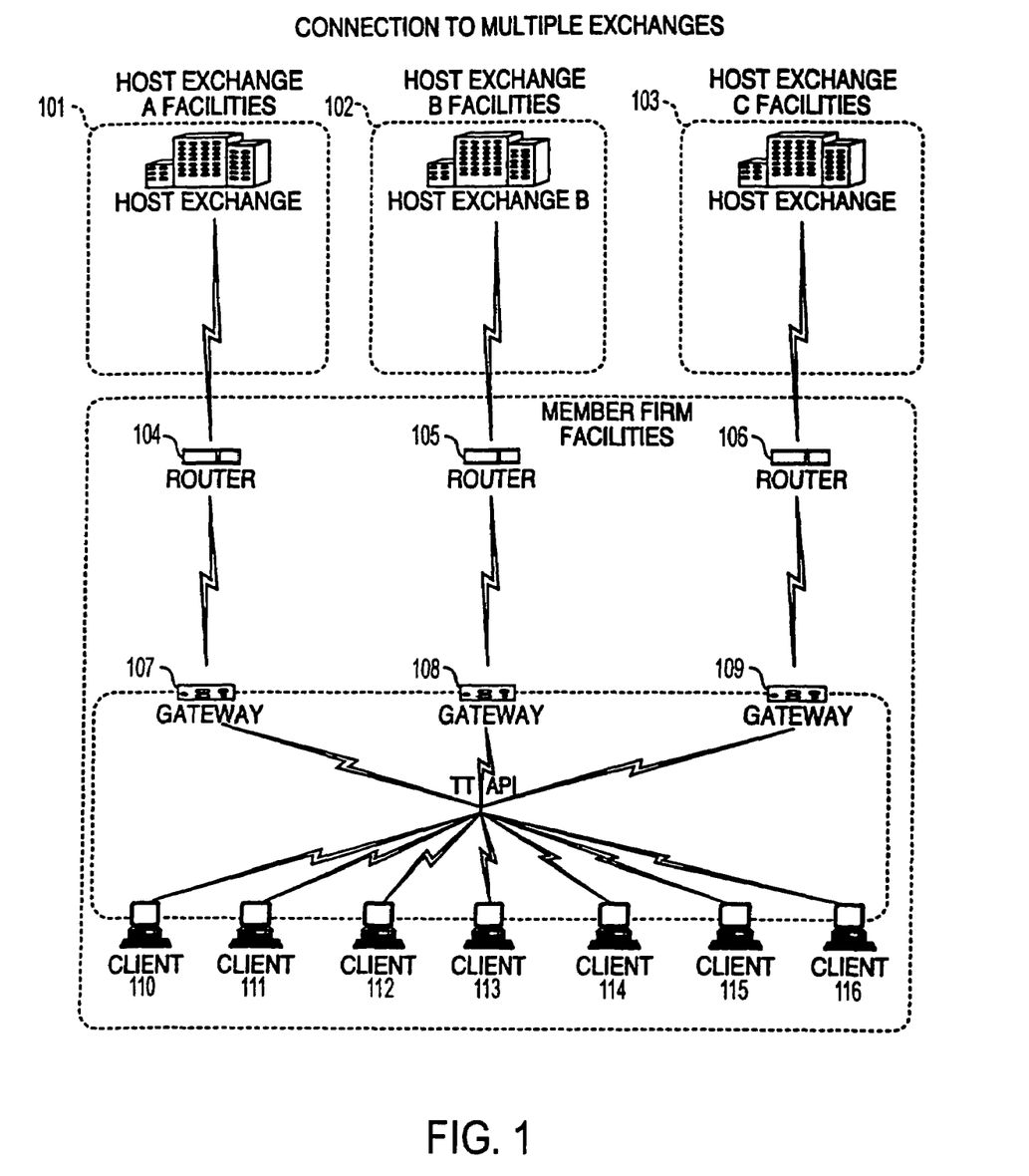
FIG. 1 illustrates the network connections between multiple exchanges and client sites.

The system can be configured to allow for trading in a single or in multiple exchanges simultaneously. Connection of the system of the present invention with multiple exchanges is illustrated in FIG. 1. This figure shows multiple host exchanges 101-103 connected through routers 104-106 to gateways 107-109. Multiple client terminals 110-116 for use as trading stations can then trade in the multiple exchanges through their connection to the gateways 107-109. When the system is configured to receive data from multiple exchanges, then the preferred implementation is to translate the data from various exchanges into a simple format. This "translation" function is described below with reference to FIG. 1. An applications program interface ("TT API" as depicted in the figure) translates the incoming data formats from the different exchanges to a simple preferred data format. This translation function may be disposed anywhere in the network, for example, at the gateway server, at the individual workstations or at both. In addition, the storage at gateway servers and at the client workstations, and/or other external storage cache historical data such as order books which list the client's active orders in the market; that is, those orders that have neither been filled nor cancelled. Information from different exchanges can be displayed at one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

The preferred embodiments of the present invention include the display of "Market Depth" and allow traders to view the market depth of a commodity and to execute trades within the market depth with a single click of a computer mouse button. Market Depth represents the order book with the current bid and ask prices and quantities in the market. In other words, Market Depth is each bid and ask that was entered into the market, subject to the limits noted below, in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also chose how far into the market depth to display on his screen.

Figure 2:
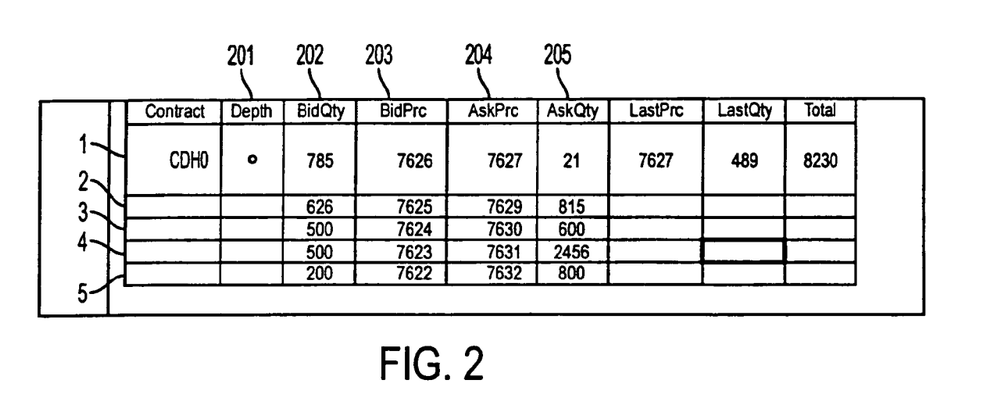
FIG. 2 illustrates screen display showing the inside market and the market depth of a given commodity being traded.

FIG. 2 illustrates a screen display of the present invention showing the inside market and the market depth of a given commodity being traded. Row 1 represents the "inside market" for the commodity being traded which is the best (highest) bid price and quantity and the best (lowest) ask price and quantity. Rows 2-5 represent the "market depth" for the commodity being traded. In the preferred embodiment of the present invention, the display of market depth (rows 2-5) lists the available next-best bids, in column 203, and asks, in column 204. The working bid and ask quantity for each price level is also displayed in columns 202 and 205 respectively (inside market—row 1). Prices and quantities for the inside market and market depth update dynamically on a real time basis as such information is relayed from the market.

In the screen display shown in FIG. 2, the commodity (contract) being traded is represented in row 1 by the character string "CDH0". The Depth column 208 will inform the trader of a status by displaying different colors. Yellow indicates that the program application is waiting for data. Red indicates that the Market Depth has failed to receive the data from the server and has "timed out." Green indicates that the data has just been updated. The other column headings in this and all of the other figures, are defined as follows. BidQty (Bid Quantity): the quantity for each working bid, BidPrc (Bid Price): the price for each working bid, AskPrc (Ask Price): the price for each working ask, AskQty (Ask Quantity): the quantity for each working ask, LastPrc (Last Price): the price for the last bid and ask that were matched in the market and LastQty (Last Quantity): the quantity traded at the last price. Total represents the total quantity traded of the given commodity.

The configuration of the screen display itself informs the user in a more convenient and efficient manner than existing systems. Traders gain a significant advantage by seeing the market depth because they can see trends in the orders in the market. The market depth display shows the trader the interest the market has in a given commodity at different price levels. If a large amount of bids or asks are in the market near the trader's position, he may feel he should sell or buy before the inside market reaches the morass of orders. A lack of orders above or below the inside market might prompt a trader to enter orders near the inside market. Without seeing the market depth, no such strategies could be utilized. Having the dynamic market depth, including the bid and ask quantities and prices of a traded commodity aligned with and displayed below the current inside market of the commodity conveys the information to the user in a more intuitive and easily understandable manner. Trends in the trading of the commodity and other relevant characteristics are more easily identifiable by the user through the use of the present invention.

Various abbreviations are used in the screen displays, and specifically, in the column headings of the screen displays reproduced herein. Some abbreviations have been discussed above. A list of common abbreviations and their meanings is provided in Table 1.

TABLE I

Abbreviations

| COLUMN | DESCRIPTION |
| --- | --- |
| Month | Expiration Month/Year |
| Bid Mbr(1) | Bid Member ID |
| WrkBuys(2) | Working Buys for entire Group ID |
| BidQty | Bid Quantity |
| ThrshBid(6) | Threshold Bid Price |
| BidPrc | Bid Price |
| Bid Qty Accum | Accumulated Bid Quantity |
| BidPrc Avg | Bid Price Average |
| AskPrc Avg | Ask Price Average |
| AskQty Accum | Accumulated Ask Quantity |
| AskPrc | Ask Price |
| ThrshAsk(6) | Threshold Ask Price |
| AskQty | Ask Quantity |
| WrkSells(2) | Working Sells for entire Group ID |
| Ask Mbr(1) | Ask Member ID |
| NetPos | Net Position |
| FFNetPos | Fast Fill Net Position |
| LastPrc | Last Price |
| LastQty | Last Quantity |
| Total | Total Traded Quantity |
| High | High Price |
| Low | Low Price |
| Open | Opening Price |
| Close | Closing Price |
| Chng | Last Price-Last Close |
| TheoPrc | Theoretical Price |
| TheoBid | Theoretical Bid Price |
| TheoAsk | Theoretical Ask Price |
| QAct | Quote Action (Sends individual quotes) |
| BQQ | Test Bid Quote Quantity |
| BQP | Test Bid Quote Price |
| Mkt BQQ | Market Bid Quote Quantity |
| Mkt BQP | Market Bid Quote Price |
| Quote | Checkbox activates/deactivates contract for quoting |
| Mkt AQQ | Market Ask Quote Quantity |
| Mkt AQP | Market Ask Quote Price |
| AQP | Ask Quote Price |
| AQQ | Ask Quote Quantity |
| Imp BidQty(5) | Implied Bid Quantity |
| Imp BidPrc(5) | Implied Bid Price |
| Imp AskQty(5) | Implied Ask Quantity |
| Imp AskPrc(5) | Implied Ask Price |
| Gamma(3) | Change in Delta given 1 pt change in underlying |
| Delta(3) | Change in price given 1 pt change in underlying |
| Vola(3) | Percent volatility |
| Vega(3) | Price change given 1% change in Vola |
| Rho(3) | Price change given 1% change in interest rate |
| Theta(3) | Price change for every day that elapses |
| Click Trd | Activate/deactivate click trading by contract |
| S (Status) | Auction, Closed, FastMkt, Not Tradable, Pre-trading, Tradable, S = post-trading |
| Expiry | Expiration Month/Year |

Click based trading enables a trader to execute trades with a single mouse click within the market depth. The trader inputs a quantity and price range once and then sends orders to market with one click on a price field in the Market Depth grid. In the preferred embodiment of the present invention, a trader using click based trading would be presented with a screen display similar that that shown in FIG. 3. This figure shows an entire trading window screen display, including the display of market depth as described with respect to FIG. 2. The portion of the display shown in FIG. 3 identified as area 301 shows various trading information and options which are not pertinent in the description of the present invention. Area 303 is the display of the inside market and the market depth as described above. Area 302 provides the trader with the necessary options to perform click based trading under the present invention.

Under the present invention, there are at least two modes of click based trading; that is, there are at least two types of trade orders that can be placed using click based trading. These are "Click" trades and "Dime" trades. Both allow the trader to trade large quantities of a commodity within the market depth or the inside market with a single mouse click. Generally, "Click" trades are used to quickly execute trade orders within a preset range with respect to the last traded price or within a preset range from the actual bid or ask price clicked by the user. "Dime" trades are used to quickly join the existing market at a chosen level. Each of these types of trades is discussed in detail herein along with corresponding examples.

Figure 3:
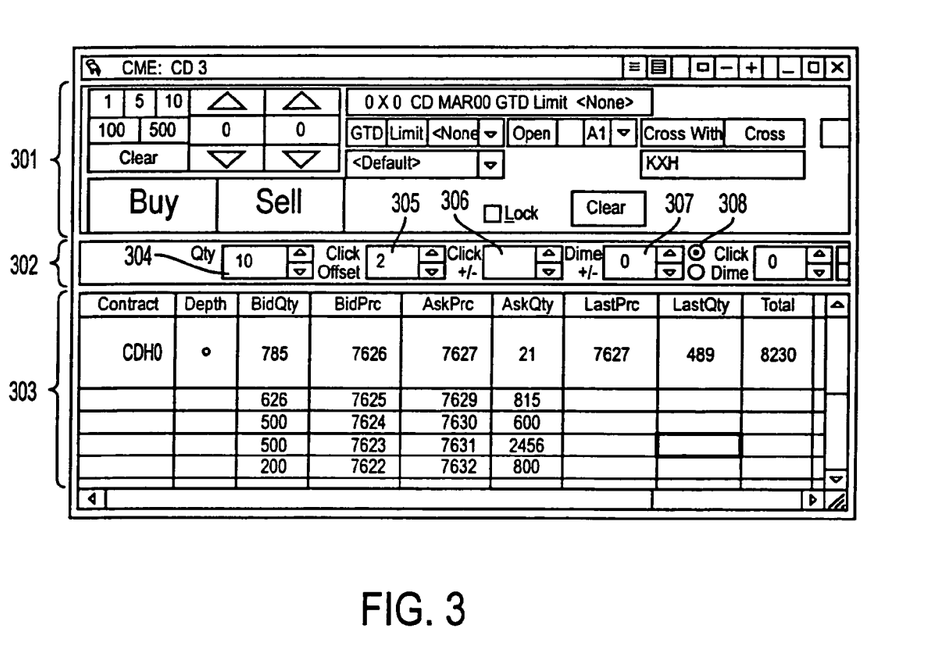
FIG. 3 illustrates an entire trading window screen display including the display of market depth.

Area 302 in FIG. 3 shows the various parameters that can be adjusted by the user when performing click based trading under the present invention. The amount shown in the "QTY" 304 box represents the amount of the commodity to be traded. The "Click Offset" amount 305 and the "Click +/–" amount 306 are used in performing click trades. The "Dime +/–" 307 amount is used in performing dime trades. The round buttons 308 next to the words "Click" and "Dime" are used to enable either click or dime trading. By setting these parameters, the user is enabled to place trades based on multiple variables with just a single click in the market depth of the commodity. Note that the elements in area 302 have been arranged in a preferred configuration. However, the invention encompasses moving the area 302 to a different location, or displaying the elements in area 302 vertically or at an angle, or separating the different elements to create a plurality of different areas 302.

Figure 4:
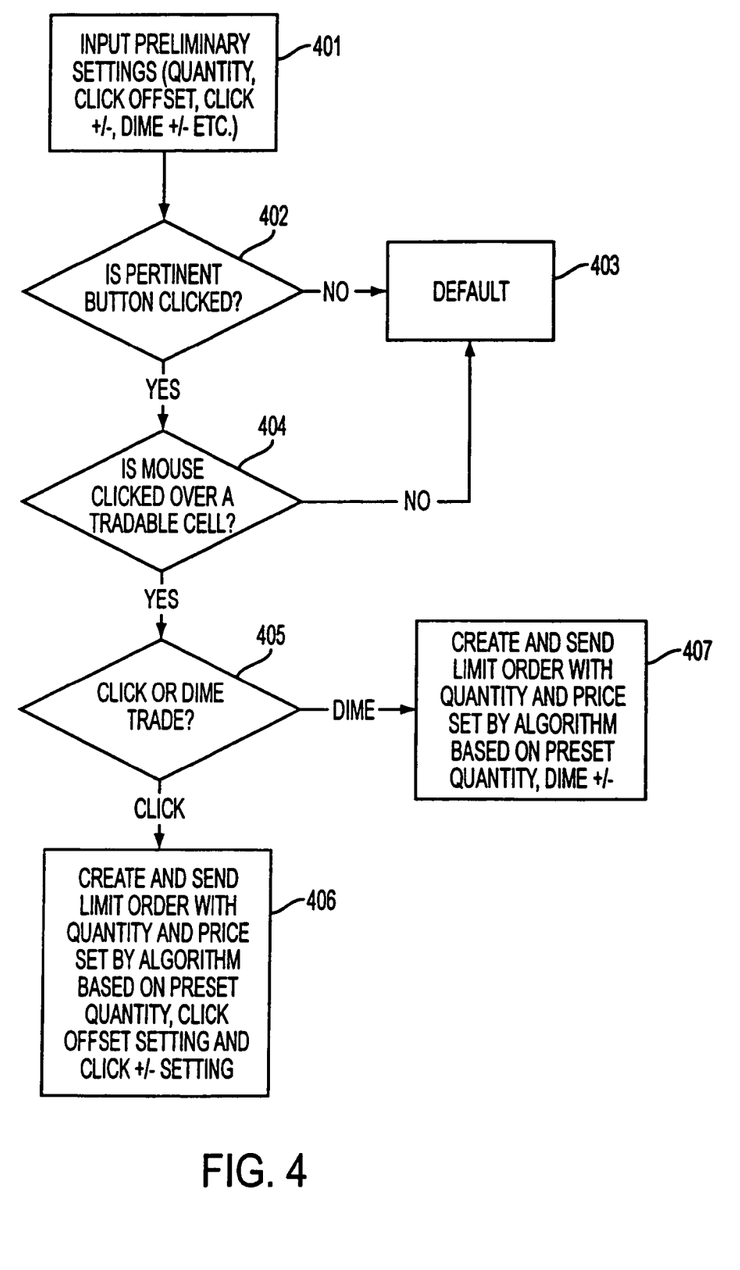
FIG. 4 is a flowchart illustrating the process of Click and Dime trading.

The basic operation of the system in performing click based trading and reacting to user inputs on a screen such as that shown in FIG. 3 is shown via the flowchart of FIG. 4. In step 401 of the process, the preliminary settings are input as discussed above with respect to the screen display in FIG. 3 and area 302. In step 402, the system determines whether a pertinent button has been clicked on a mouse or some other form of input device indicating that the user is initiating the placement of a trade order. If the system determines that a pertinent button was clicked, the system then determines, in step 404, whether the mouse pointer was positioned over a tradeable cell on the screen display when the button was clicked. Tradeable cells include those in area 303 under the four bid and ask columns 202-205. If a pertinent button was not clicked or if the mouse pointer was not positioned over a tradeable cell, the system does not attempt to place a click based trade order and, in step 403 returns to a default condition, such as displaying market information and awaiting initiation of a trade order. If, however, a pertinent button was clicked over a tradeable cell, in step 405 the system checks to determine whether a click trade is requested or a dime trade is requested. In the preferred embodiment of the present invention, this determination is made based on which button ("Click" or "Dime") has been selected on the screen display in area 302. As will be seen in the description of other embodiments of the invention, this determination can also be made based upon which mouse button has been depressed. If it is determined that a click trade is requested, the system, in step 406, creates and sends a limit order to the exchange with the quantity and price set in accordance with an algorithm (discussed herein) based on the preliminary settings and the market prices. Similarly, if it is determined that a dime trade is requested, the system, in step 407, creates and sends a limit order to the exchange with the quantity and price set in accordance with a separate algorithm.

Next, placement of click trades under the present invention, as opposed to dime trades, is described with reference to the screen displays of FIGS. 3 and 5. Using the various parameters, traders can use the present invention to implement various trading strategies. Described herein are two such strategies based on two embodiments of the present invention and its provisions for placing click trades. The first involves the use of the "Click +/–" feature of the invention. Trading with Click +/– allows a trader to chase a fast moving market up to a certain amount of ticks. A trader would set the number of ticks in the Click +/– field once. He would then be able to send orders to market with a single click in the market depth for a price up to (or down to if selling) the price clicked plus (or minus if selling) the number of ticks in the Click +/– field. A "tick" is the minimum change in a price value that is set by the exchange for each commodity (for example, $0.01, $0.05, $0.10 or any other value). The best available order in the market within the preset parameters would be filled.

If the market was moving quickly and the inside market was rapidly increasing or decreasing (or both alternatively), use of Click +/– will insure that the trader can keep up with the changes. Using the traditional electronic trading method, he might not be able to sell or buy large quantities at or near the price he needs because the price moved before he could enter all of the required data. Using Click +/–, he can trade pre-specified quantities at any chosen price plus or minus the number of ticks chosen. This makes it more likely that his trades will get filled in a rapidly changing market before the market moves away.

The following equations are used to exemplify how the system would determine at what price an order should be placed. The following abbreviations are used in the formulas: Ask Price clicked with Click trading button=A, Bid. Price clicked with Click trading button=B, Click +/– value=C, Quantity=Q, Buy limit order sent to the market=Bo and Sell limit order sent to the market=So.

$$\text{If } C>0 \text{ then } Bo=(A+C)Q \qquad \text{(Eq. 1)}$$

$$\text{If } C>0 \text{ then } So=(B-C)Q \qquad \text{(Eq. 2)}$$

If the user has set the Click +/– value to 0, the Click +/– feature is essentially disabled and the Click Offset feature is enabled (discussed herein).

Figure 5:
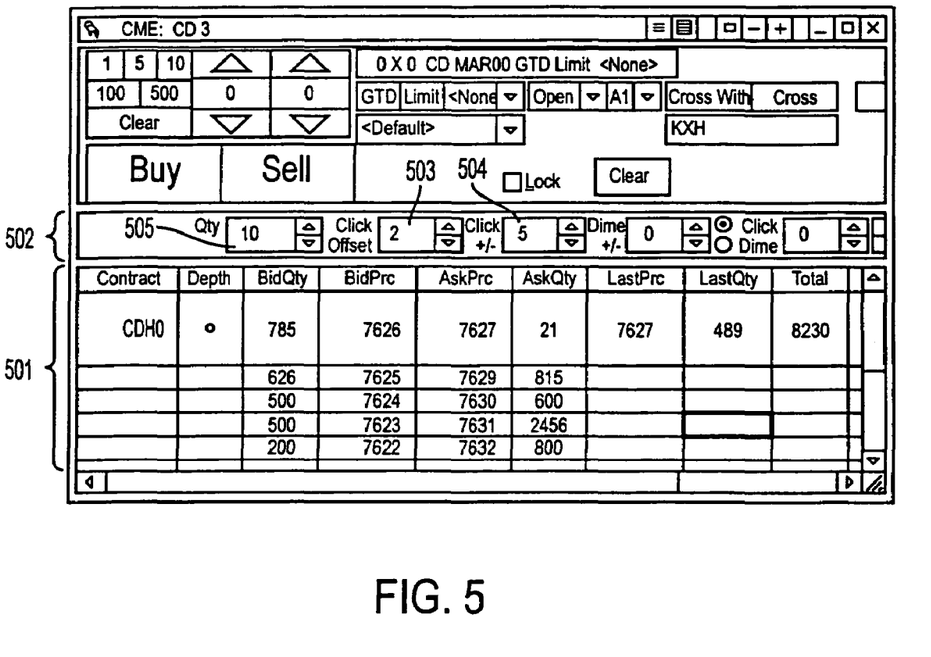
FIG. 5 illustrates an entire trading window screen display including the display of market depth in which the Click +/− feature is enabled.

Referring now to the screen display shown in FIG. 5, the "Click Offset" 502 feature is disabled since a "Click +/–" 504 amount greater than 0 is entered. In the case shown, the Click +/– amount is set to "5". This entry will enable the trader to trade at any price he clicks in the market grid area 501 and enter an order for up to (or down to if selling) 5 ticks above (or below) the clicked price. Using the values shown in the screen display of FIG. 5, the placement of click trades using the Click +/– feature is now described using examples. In these examples, and as shown in FIG. 5, the QTY 505 is 10 and the Click +/– 504 value is 5.

Suppose the trader seeks to sell 10 lots of the commodity. He clicks on the 7623 Bid Price, which is three rows below the inside market. This will send a limit order to the exchange to sell 10 lots for as low as 7618 (7623 minus 5 ticks). The best available price will be filled first. Thus, in this scenario, all 10 lots will be filled because bids exist in the marketplace in this price range and the quantities amount to many more than 10 lots. Because the best BidPrc will be used, the 10 lots will be sold at 7626, if it is still available when the order is made.

Suppose the trader seeks to buy 10 lots of the commodity. He clicks on the 7630 Ask Price, which is two rows above the inside market. This will send a limit order to the exchange to buy 10 lots at the best prices available for as much as 7635

(7630 plus 5 ticks). This order will also be filled because offers exist in the marketplace in this price range and the quantities amount to many more than 10 lots.

There is also a safety mechanism in the present invention that can be used when placing click trades. This feature is known as "Click Offset" and it prevents an order from being placed at a price that is too far from the last traded price of the commodity. Effectively, the trader establishes a floor or ceiling above or below the last traded price by enabling Click Offset. To use the Offset feature, a trader would set the Click +/− value to zero. He would then set a figure in the Click Offset field. This will halt any orders that are above or below the last traded price by at least the number of ticks in the Click Offset field. As mentioned above, a "tick" is the minimum change in a price value that is set by the exchange for each commodity (for example, $0.01, $0.05, $0.10 or any other value). Using Click Offset a trader could trade in the market depth, but no order would be sent to market that is entered by the trader for a price further from the last price than the figure displayed in the Click Offset field.

Without the Click Offset feature, a trader might intend to click on a particular price but, between the time he decides to do so and the time he actually clicks (which may be only hundredths of a second), the price may change. He may not be able to stop the downward motion of his finger and the order would be sent to market at an incorrect or undesired price. Sometimes the change in price is significant and could cost the trader a lot of money. Alternatively, the mouse pointer may inadvertently be improperly positioned when the trader clicks which, without the Click Offset feature, would also send an order at an incorrect or undesirable price.

The following equations are used to exemplify how the system would determine whether an order should be placed when the Click Offset feature is used. The following abbreviations are used in these formulas: Ask Price clicked with Click trading button=A, Bid Price clicked with Click trading button=B, Last Traded Price=L, Click Offset value=CO, Click +/− value=C, Quantity=Q, Buy limit order sent to the market=Bo and Sell limit order sent to the market=So.

If $C=0$ and if absolute value of $(L-A) > CO$ then NO ORDER SENT (Eq. 3)

If $C=0$ and if absolute value of $(L-B) > CO$ then NO ORDER SENT (Eq. 4)

If $C=0$ and if absolute value of $(L-A) \leq $ Off then $Bo = (A)Q$ (Eq. 5)

If $C=0$ and if absolute value of $(L-B) \leq $ Off then $So = (B)Q$ (Eq. 6)

Referring now to the screen display shown in FIG. 3, the "Click Offset" feature is enabled since the "Click +/−" amount is set to 0 (blank). In the case shown, the Click Offset amount is set to "2". This entry will enable the trader to trade at any price he clicks in the market grid area 301 so long as it is within two ticks from the last price (LastPrc) 7627. Using the values shown in the screen display of FIG. 3, the placement of click trades using the Click Offset feature is now described using examples. In these examples, and as shown in FIG. 3, the QTY is 10, the Click Offset value is 2 and the last price at which the commodity was traded is 7627.

Suppose the trader wishes to buy 10 lots. The last traded price is 7627 so the trader might right click on 7629, which is one row below the inside market ask price. This would send a buy limit order to the market for his previously entered quantity (10 in the screen display of FIG. 3) for a price of 7629. Because this is within two ticks of the last traded ask price, the order would go to the market. All 10 lots would be filled because there are 836 (815 plus 21) lots in the market at least at this price. If, however, the trader clicked on 7630 or higher, the system would not allow a trade order to be generated because the price is greater than two ticks above the last traded price.

Both of the Click +/− and the Click Offset features of placing click trades in the present invention as described above are shown in the flowchart of FIG. 6. First, in step 601, the system determines whether a click trade has been requested. This step connects with step 406 of FIG. 4. In one embodiment, as discussed above and as shown in box 601, determination that a click trade is requested can be based, in part, on which mouse button was depressed. In step 602, the system determines whether a buy or a sell order is requested based upon whether a price has been clicked in the Ask column or in the Bid column. A click in the Bid column indicates that the trader is initiating a sell order wherein the system then moves to step 603. A click in the Ask column indicates that the trader is initiating a buy order wherein the system then moves to step 604.

Figure 6:
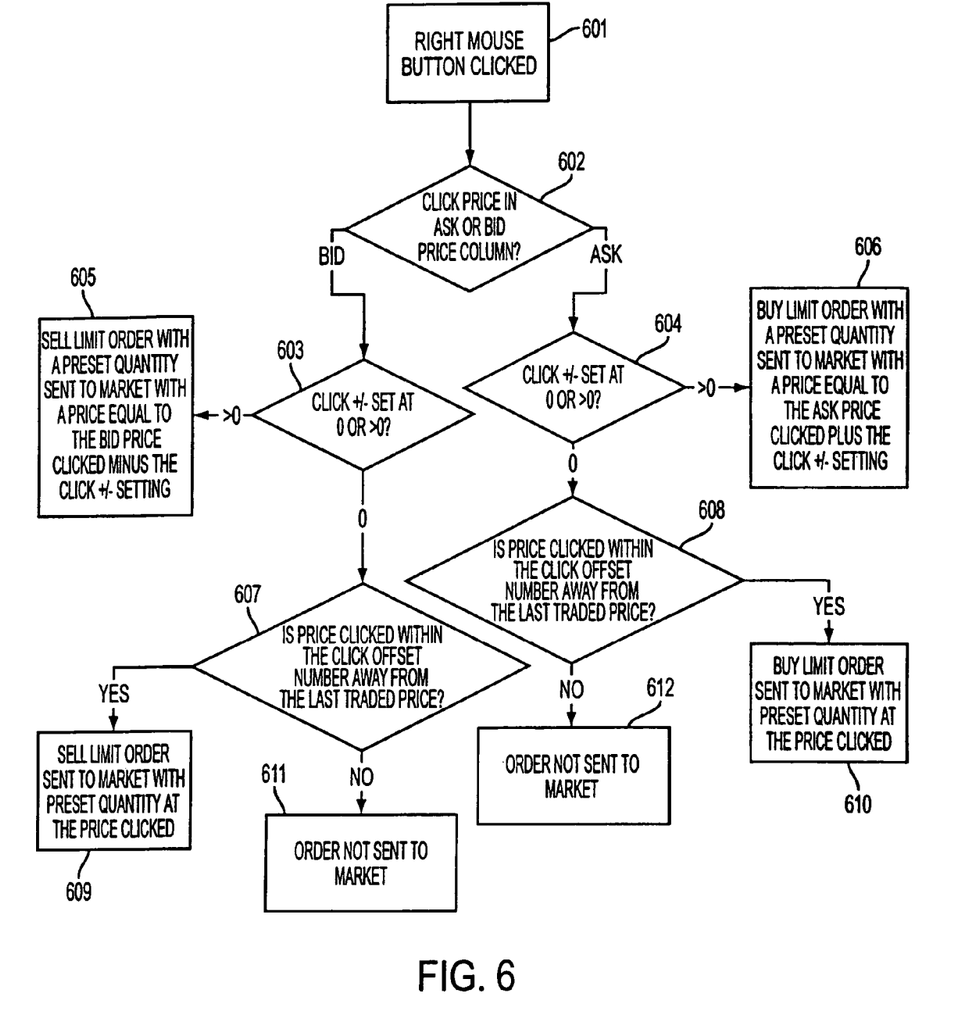
FIG. 6 is a flowchart illustrating the process of Click trading.

The system, in each of steps 603 and 604 determines whether the Click +/− feature is being used by checking whether the Click +/− value is set to 0 or whether it is set to a number greater than 0. If, in 603 it is determined that the Click +/− value is set to greater than 0, the system then creates, in step 605, a sell limit order for the preset quantity and a price equal to the Bid price clicked minus the Click +/− value (see Eq. 2). The sell limit order is sent to the market. Similarly, if in step 604 it is determined that the Click +/− value is set to greater than 0, the system then creates, in step 606, a buy limit order for the preset quantity and for a price equal to the Ask price clicked plus the Click +/− setting (see Eq. 1). The buy limit order is sent to the market.

The following describes the use of the Click Offset feature of the present invention with reference to the flowchart of FIG. 6. If in step 603 it is determined that the Click +/− value is 0, the system moves to step 607. Similarly, if in step 604 it is determined that the Click +/− value is 0, the system moves to step 608. In each of steps 607 and 608, the system determines whether to allow the buy or sell trade order to be sent to the market. In these steps, the system determines whether the price clicked is within the Click Offset value away from the last trade price of the commodity. If, in step 607, the system determines that the price clicked is within the Click Offset value away from the last trade price of the commodity, then, in step 609 (see Eq. 6), it creates a sell limit order for the preset quantity at the Bid price clicked. If not, then, in step 611 (see Eq. 4), no trade order is sent to the market and the trader's attempt to place a trade is prevented. Similarly, if in step 608, the system determines that the price clicked is within the Click Offset value away from the last trade price of the commodity, then, in step 610 (see Eq. 5), it creates a buy limit order for the preset quantity at the Ask price clicked. If not, then, in step 612 (see Eq. 3), no trade order is sent to the market and the trader's attempt to place a trade is prevented.

Next, placement of dime trades under the present invention, as opposed to click trades, is described with reference to the screen display of FIG. 7 and the flowchart of FIG. 8. Dime trading allows traders to join the market at a value above or below the best bid or ask by a specified number. Using Dime +/−, a trader can enter orders into the market that will not be filled until an equal match met the order in the market. The trader selects the quantity as he did when click trading, and enters the tick amount in the "Dime +/−" field. A setting of zero ("0") ticks will enter an order for the price clicked. A tick setting of any amount greater than or less than zero ("0")

sends an order to the market for the price clicked plus (minus if selling) the Dime +/− setting. If the trader clicked on the Bid order column, a bid would be sent, while a click on the Ask column would send an ask order. This type of trading may be utilized to join the market or even to move the prevailing market prices up or down.

The following equations are used to exemplify how the system would determine at what price an order should be placed when using Dime trading. The following abbreviations are used in these formulas: Ask Price clicked with Dime trading button=A, Bid Price clicked with Dime trading button=B, Dime +/− value=D, Quantity=Q, Buy limit order sent to the market=Bo and Sell limit order sent to the market=So.

$$Bo=(B+D)Q \qquad (\text{Eq. 7})$$

$$So=(A-D)Q \qquad (\text{Eq. 8})$$

Figure 7:
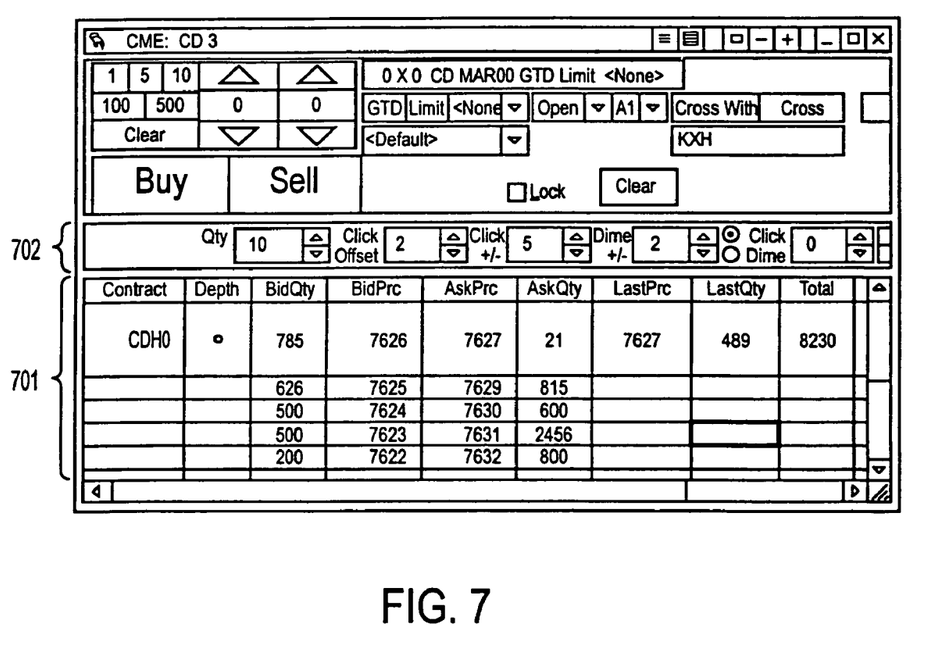
FIG. 7 illustrates an entire trading window screen display including the display of market depth in which the Dime trading feature is enabled.
Figure 8:
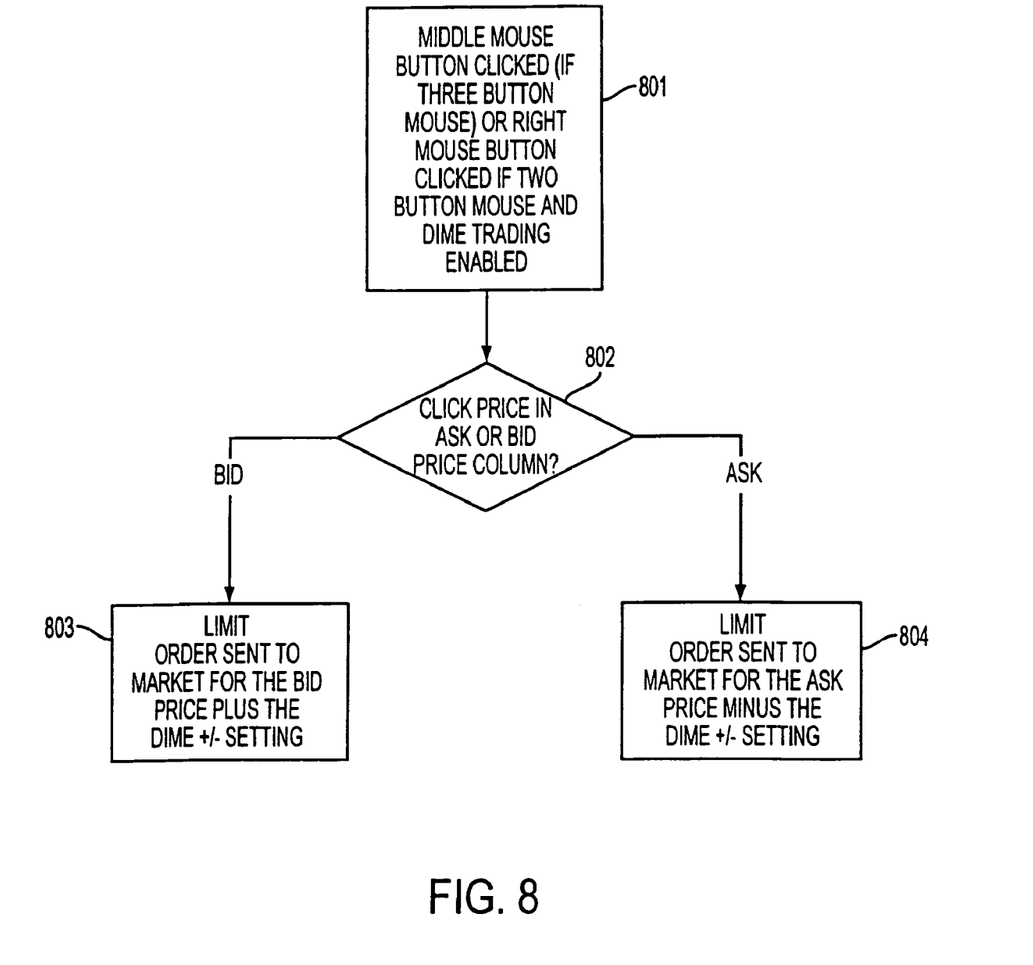
FIG. 8 is a flowchart illustrating the process of Dime trading.

Using the values shown in the screen display of FIG. 7, the placement of dime trades is now described using examples. In these examples, and as shown in area 702 of FIG. 7, the QTY is 10, the Dime +/− value and the Dime button has been selected. Suppose the trader wishes to join in the market with those wishing to buy a commodity at a certain price. In this screen, the trader might click in area 701 on 7622, which is four rows below the inside market bid price. This would send a buy order to the market for his previously entered quantity (10 in the screen display of FIG. 7) for a price of 7624 or better (up to two ticks above the clicked price). Nothing would be filled at this point. Rather, the orders would be placed in the market as a Bid limit order at a price of 7624 and would only be filled if an Ask order entered the market for a price of 7624 or better (lower).

Suppose that the Dime +/− was set to a negative number, for example −3. In this case, a click on 7622 in the BidPrc column would enter a Bid limit order for a price of 7619. None of these would be filled in the market until and unless the Ask orders enter the market for a price of 7619. or better (lower).

The process for placing dime trades in the present invention as described above are shown in the flowchart of FIG. 8. First, in step 801, the system determines whether a dime trade has been requested. This step connects with step 407 of FIG. 4. In one embodiment, as discussed above and as shown in box 801, determination that a dime trade is requested can be based, in part, on which mouse button was depressed. In step 802, the system determines whether the trader wants to join the market of buy orders or of sell orders for the commodity based upon whether a price has been clicked in the Bid column or in the Ask column. A click in the Bid column indicates that the trader is initiating a buy order and the system then moves to step 803. A click in the Ask column indicates that the trader is initiating a sell order and the system then moves to step 804. In step 803, the system creates a buy limit order at a price equal to the Bid price clicked plus the Dime +/− amount (see Eq. 7). The order is sent to the exchange. In step 804, the system creates a sell limit order at price equal to the Ask price clicked minus the Dime +/− amount (see Eq. 8). The order is sent to the exchange. In this way, the trader can easily join the market for a given commodity by entering orders into the market that will not be filled until an equal match met the order in the market.

Other features of the present invention, applicable to both click and to dime trading are now described. Reference is made to FIG. 3, and specifically in area 302, to the fields containing values, including the QTY 304, the Click Offset 305, the Click +/− 306 and the Dime +/− 307 fields. The values in these fields can be set by typing in the numbers through a keyboard or by clicking on the up and down arrows to increment or decrement the value within the corresponding field. In the present invention, however, there is a third way to adjust the values in these fields which furthers the goal of reducing the amount of time required to place trade orders. The values in these fields can be adjusted by simply positioning the mouse pointer in the desired field and clicking a button. In the preferred embodiment of the invention, a click of the left mouse button causes the value in the field the increment by 1 and a click of the right mouse button causes the value to decrement by 1. This functionality is accomplished by including programming to cause clicks of certain of the mouse buttons to provide the above-described incrementing only when the mouse is detected above these fields.

In one embodiment of the present invention, a two-button mouse is used by the trader to make selections on the screen and initiate trade orders. In this case, as discussed above, the user selects whether he wishes to be initiating click trades or dime trades by selecting the appropriate button in area 302. Once selected, the right button of the mouse is used to initiate as many click or dime trades as the trader desires, depending on which mode is selected, by clicking on an Ask or Bid price in area 303. In another embodiment of the invention, a three-button mouse is used by the trader. This eliminates the need to select either the click button or the dime button since both types of trades can be executed from the mouse at any given time. Using a three-button mouse, and with the mouse pointer positioned over a tradeable cell as described above, a trader could place a dime trade with a single click of the middle mouse button and place a click trade with a single click of the right mouse button. This embodiment of the present invention also furthers the goal of reducing the amount of time required to place trade orders since it eliminates the time necessary to switch between click and dime modes of trading.

Figure 9:
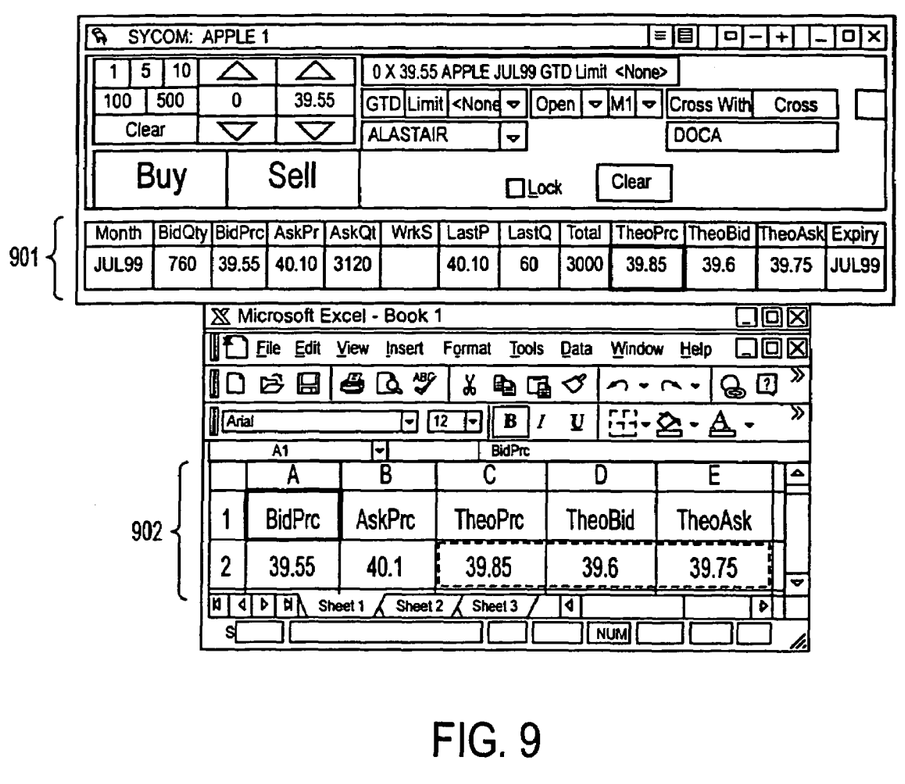
FIG. 9 is a screen display illustrating the incorporation of theoretical values into the system of the present invention.

Another feature of the present invention involves the use of theoretical trading prices as well as theoretical ask and bid prices. Such theoretical values can assist the trader in deciding whether to place trades and, in the present invention, can be used to prevent the trader from placing trades that are outside of the parameters defined by the theoretical values. These theoretical values are pre-determined and may be calculated by an external program or algorithm. The values are imported into the present system automatically or can be entered by the trader. FIG. 9 shows a screen display where, in area 902, values generated from a spreadsheet 902 are imported into the present system and shown in area 901. A screen button "Theo" (not shown) can be clicked to enable the use of the Theoretical Value in click trading. Thus, the trader's click trades would then be restricted by this value and no order would be sent that was not as good or better than the theoretical value. This value would be applied irrespective of whether the trader attempted to buy or sell. Thus, if the theoretical value was 102 and the trader attempted to click trade in the BidPrc column at 101, no order would be sent because the clicked value was worse than the theoretical value. Clicks on 102, 103, 104 or higher in the BidPrc column would be allowed because these would send sell orders as good as or better than the theoretical value.

Separate Theoretical Bid and Ask prices can also be used. This feature can be enabled by clicking on a screen button "B/A" (Bid/Ask—not shown). A separate theoretical value could be established for each bid and ask in accordance with predetermined algorithms based on various parameters. This is shown in FIG. 9 as TheoBid and TheoAsk. Separate bid and ask theoretical values can also be established for each row in the market depth. Each attempted bid or ask order would be checked against each corresponding theoretical bid or ask value. If the clicked price is as good or better than the corresponding Bid or Ask theoretical value, only then will the order be sent.

An additional feature of the present invention relating to the use of theoretical values is the ability to modify "edge". Traders may edge their trades away from the theoretical values described above. When either the Theo or B/A screen buttons are clicked enabled, a white field (not shown) appears in a box adjacent to "Theo" and "B/A." Traders can input a number of ticks here which allows them to prevent orders from being placed that are not better than the corresponding theoretical value by the amount of ticks entered. For example, with a 12.2 theoretical value, a 12.6 market bid, and an edge value of 4 ticks, a trader's order to sell at the market bid price will pass the edge test and the trade order will be sent. But, if the bid moved one tick lower to 12.5, an attempt to sell would fail the edge test, because only 3 ticks of edge would be made on the trade and, thus, no trade order would be sent. Edge trading can also be used with the Click +/− setting. A trader who sets the Click +/− value to 4 ticks will construct a bid 4 ticks higher than the offer or an offer 4 ticks lower than the bid. If this constructed price fails the edge test, the order will not be sent.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

We claim:

1. A method of placing a trade order for a commodity on an electronic exchange using a client system, the method comprising:
   setting a preset offset parameter responsive to receiving a command from a user input device;
   initiating placement of a trade order with a single action of a user relating to the commodity at a price, wherein the step of initiating placement comprises selecting the price; establishing a second price value;
   computing an acceptable range of prices by a computer processor at which a trade order can be sent, wherein the acceptable range of prices is based on the preset offset parameter and the second price value;
   comparing the price to the acceptable range of prices;
   when the price is within the acceptable range of prices, automatically electronically sending the trade order to the electronic exchange; and
   when the price is outside the acceptable range of prices, automatically electronically refraining from sending the trade order to the electronic exchange.

2. The method of claim 1 wherein the second price value is based on the last traded price of the commodity.

3. The method of claim 1 wherein the second price value is based on a theoretical value.

4. The method of claim 1 wherein the preset offset parameter represents a number of price levels away from the second price value used to compute the acceptable range of prices.

5. The method of claim 1 wherein a boundary of the acceptable range of prices is defined by adding the preset offset parameter to the second price value.

6. The method of claim 1 wherein a boundary of the acceptable range of prices is defined by subtracting the preset offset parameter from the second price value.

7. The method of claim 1 wherein the acceptable range of prices comprises price levels between a boundary price level and the second price value, wherein the boundary price level is based on the preset offset parameter and the second price value.

8. The method of claim 1 wherein the acceptable range of prices comprises price levels between a first boundary price level and a second boundary price level, the first boundary price level is computed by adding the preset offset parameter to the second price value and the second boundary price level is computed by subtracting the preset offset parameter from the second price value.

9. A computer readable medium storing a program product for placing a trade order for a commodity on an electronic exchange using a client system, said program product comprising machine-readable program code for causing, when executed, one or more machines to perform the following method steps:
   setting a preset offset parameter responsive to receiving a command from a user input device;
   initiating placement of a trade order with a single action of a user relating to the commodity at a price, wherein
   the step of initiating placement comprises setting the price; establishing a second price value; computing an acceptable range of prices by a computer processor at which a trade order can be sent, wherein the acceptable range of prices is based on the preset offset parameter and the second price value;
   comparing the price to the acceptable range of prices;
   if the price is within the acceptable range of prices, automatically electronically sending the trade order to the electronic exchange; and
   if the price is outside the acceptable range of prices, automatically electronically refraining from sending the trade order to the electronic exchange.

10. A method of placing a trade order for a commodity on an electronic exchange having an inside market with a highest bid price and a lowest ask price, using a client system with a graphical interface and a user input device, the method comprising:
   setting a preset offset parameter responsive to receiving a command from a user input device;
   dynamically displaying, on the graphical interface, market depth of the commodity comprising information representing orders at the inside market and orders outside of the inside market through a display of prices and quantities of a plurality of bids and asks in the market for the commodity;
   displaying, on the graphical interface, an order entry region comprising a plurality of areas for receiving commands to send trade orders, each area associated with a price of the display of prices;
   initiating placement of a trade order relating to the commodity at a price in response to a single action of the user input device with a pointer of the user input device positioned over an area in the order entry region associated with the price; establishing a second price value; computing an acceptable range of prices by a computer processor at which a trade order can be sent, wherein the acceptable range of prices is based on the preset offset parameter and the second price value;
   comparing the price to the acceptable range of prices;
   if the price is within the acceptable range of prices, automatically electronically sending the trade order to the electronic exchange; and
   if the price is outside the acceptable range of prices, automatically electronically refraining from sending the trade order to the electronic exchange.

11. The method of claim 10 wherein the second price value based on the last traded price of the commodity.

12. The method of claim 10 wherein the second price value based on a theoretical value.

13. The method of claim 10 further comprising modifying the price of the trade order based upon a second parameter, wherein the trade order that is sent to the electronic exchange comprises the modified price.

14. The method of claim 10 wherein quantity associated with the trade order is for a pre-determined fixed quantity.

15. The method of claim 14 wherein the pre-determined fixed quantity can be incremented or decremented by a single action of the user input device.

16. The method of claim 14 wherein the acceptable range of prices comprises price levels between a boundary price level and the second price value, wherein the boundary price level is based on the preset offset parameter and the second price value.

17. The method of claim 14 wherein the acceptable range of prices comprises price levels between a first boundary price level and a second boundary price level, the first boundary price level is computed by adding the preset offset parameter to the second price value and the second boundary price level is computed by subtracting the preset offset parameter from the second price value.

* * * * *